US012605858B2

(12) United States Patent
Lülfing et al.

(10) Patent No.: US 12,605,858 B2
(45) Date of Patent: Apr. 21, 2026

(54) BELT CUTTER

(71) Applicant: SafeWorks, LLC, Tukwila, WA (US)

(72) Inventors: Frank Lülfing, Wietze (DE); Viatcheslav Maik Seibel, Bremen (DE)

(73) Assignee: SafeWorks, LLC, Atlanta, GA (US)

( * ) Notice: Subject to any disclaimer, the term of this patent is extended or adjusted under 35 U.S.C. 154(b) by 0 days.

(21) Appl. No.: 18/453,948

(22) Filed: Aug. 22, 2023

(65) Prior Publication Data

US 2024/0042642 A1 Feb. 8, 2024

Related U.S. Application Data

(63) Continuation of application No. 16/461,254, filed as application No. PCT/US2017/061512 on Nov. 14, 2017, now Pat. No. 11,731,300.

(60) Provisional application No. 62/422,522, filed on Nov. 15, 2016.

(51) Int. Cl.

*B26D 1/08* (2006.01)
*B26D 3/00* (2006.01)
*B26D 5/02* (2006.01)

(52) U.S. Cl.

CPC ............... *B26D 1/08* (2013.01); *B26D 3/003* (2013.01); *B26D 5/02* (2013.01)

(58) Field of Classification Search

CPC ... B26D 1/08; B26D 1/04; B26D 5/02; B26D 5/14; B26D 3/003; B21D 28/243
USPC ................... 83/631, 635–636, 694, 389, 384
See application file for complete search history.

(56) References Cited

U.S. PATENT DOCUMENTS

| | | | |
|---|---|---|---|
| 119,827 | A | 10/1871 | Cowles |
| 237,178 | A | 2/1881 | Goss |
| 429,701 | A | 6/1890 | Parmelee |
| 1,419,789 | A | 6/1922 | Webb |
| 2,202,514 | A | 5/1940 | Benner |
| 2,351,435 | A | 6/1944 | Kent |

(Continued)

FOREIGN PATENT DOCUMENTS

| | | | |
|---|---|---|---|
| CN | 1210779 | A | 3/1999 |
| CN | 1241959 | A | 1/2000 |

(Continued)

OTHER PUBLICATIONS

International Patent Application No. PCT/US2017/061512; Int'l Preliminary Report on Patentability; dated Nov. 15, 2018; 13 pages.

(Continued)

*Primary Examiner* — Nhat Chieu Q Do
(74) *Attorney, Agent, or Firm* — Foley & Lardner LLP

(57) ABSTRACT

A portable belt cutting device comprises a cutting head and a cutting blade. The cutting blade is configured to cut a belt. The cutting blade includes an integrally-formed blade connecting element with the cutting blade configured to be moveably arranged on the cutting head and supported by the cutting head such that the cutting blade is moveable between a retracted position and an extended position. The cutting head comprises a drive spindle for moving the cutting blade from the retracted position towards the extended position. The drive spindle comprises a drive spindle connecting element integrally formed at an end portion of the drive spindle. The drive spindle connecting element is rotatable with, and directly coupled to, the cutting blade connecting element.

11 Claims, 3 Drawing Sheets

(56) References Cited

U.S. PATENT DOCUMENTS

| | | | | |
|---|---|---|---|---|
| 2,744,429 | A * | 5/1956 | Seely | F25B 41/37 29/890.035 |
| 2,761,212 | A * | 9/1956 | Gill | B23D 21/10 30/100 |
| 2,837,767 | A | 6/1958 | Macdonald | |
| 2,983,043 | A * | 5/1961 | Petersen | B23D 21/10 30/100 |
| 3,199,193 | A * | 8/1965 | Norty | B23D 29/002 30/228 |
| 3,376,728 | A | 4/1968 | Ladislav | |
| 4,244,255 | A | 1/1981 | Dykstra | |
| 4,581,825 | A | 4/1986 | Parton | |
| 4,587,737 | A | 5/1986 | Wilson | |
| 5,634,387 | A | 6/1997 | Squires | |
| 5,669,296 | A * | 9/1997 | Newton | B30B 1/18 100/231 |
| 5,996,459 | A | 12/1999 | Cornell et al. | |
| 6,152,007 | A | 11/2000 | Sato | |
| 7,000,521 | B1 * | 2/2006 | Cheng | B26D 1/08 83/636 |
| 7,249,551 | B1 | 7/2007 | Ray | |
| 8,020,478 | B2 | 9/2011 | Cheng | |
| 2008/0201958 | A1 * | 8/2008 | Herman | B26D 7/2614 30/131 |
| 2010/0011930 | A1 * | 1/2010 | Scarborough | B26D 1/08 83/563 |
| 2010/0089217 | A1 * | 4/2010 | Cheng | B23D 23/00 83/638 |
| 2010/0124595 | A1 | 5/2010 | Pattenden | |
| 2011/0095150 | A1 | 4/2011 | Geier et al. | |
| 2012/0165107 | A1 | 6/2012 | Guo et al. | |
| 2013/0205958 | A1 | 8/2013 | Janszen et al. | |
| 2015/0052966 | A1 * | 2/2015 | Smith | H01R 43/042 72/454 |
| 2016/0245325 | A1 | 8/2016 | Chen | |
| 2017/0095909 | A1 | 4/2017 | Chen | |
| 2017/0138386 | A1 * | 5/2017 | Hsu | F16B 23/0038 |
| 2017/0190029 | A1 | 7/2017 | Cuesta | |
| 2018/0109084 | A1 * | 4/2018 | Smith | H02G 1/005 |
| 2018/0116814 | A1 | 5/2018 | Sullivan et al. | |
| 2019/0275691 | A1 | 9/2019 | Wang | |

FOREIGN PATENT DOCUMENTS

| | | | |
|---|---|---|---|
| CN | 201702793 | U | 1/2011 |
| CN | 202318399 | U | 7/2012 |
| CN | 202556458 | U | 11/2012 |
| CN | 204194917 | U | 3/2015 |
| CN | 205201681 | U | 5/2016 |
| CN | 205219191 | U | 5/2016 |
| CN | 105666540 | A | 6/2016 |
| CN | 205310339 | U | 6/2016 |
| CN | 205398657 | U | 7/2016 |
| CN | 205674266 | U | 11/2016 |
| EP | 2 631 045 | A1 | 8/2013 |
| GB | 1 131 567 | A | 10/1968 |
| JP | H07-000269 | U | 1/1995 |
| WO | WO-2016/164139 | A1 | 10/2016 |

OTHER PUBLICATIONS

International Patent Application No. PCT/US2017/061512; Int'l Written Opinion and Search Report; dated Feb. 16, 2018; 9 pages.

* cited by examiner

BELT CUTTER

CROSS-REFERENCE TO RELATED APPLICATIONS

This application is a continuation application filed under 35 U.S.C. § 120 and claims priority to U.S. patent application Ser. No. 16/461,254, filed May 15, 2019, which claims priority to International Patent Application No. PCT/US2017/061512, filed Nov. 14, 2017, which claims priority to and the benefit of U.S. Patent Application No. 62/422,522, entitled "BELT CUTTER," the disclosures of which are incorporated herein by their entirety.

SUMMARY

Belt cutters may be used for cutting belts such as flat belts and flat belts having a wire reinforcement. A belt cutter may have a drive mechanism that actively drives a cutting blade from a retracted position into an extended position, cutting the belt along the way. Drive mechanisms may have pneumatic or hydraulic plungers that are coupled to the blade. The blade in turn may be coupled to a resilient member such as a helical spring, against the resilient force of which the blade is actuated by the driving mechanism. After cutting is completed, the resilient force stored in the spring may be used to move the blade back towards the retracted position.

This may be referred to as a passive drive mechanism. One use with such systems is that the blade may get stuck, e.g., due to friction against the cut belt, particles of the belt that may have come loose during cutting, etc. In such cases the spring force may be insufficient to reliably move the blade all the way back into the retracted position.

Described herein is a portable belt cutting device, which may be usable in some embodiments for cutting wire-reinforced flat belts. In one embodiment, the portable belt cutting device may have a cutting head, a cutting blade that is moveably arranged on the cutting head and supported by the cutting head such that the blade is moveable between a retracted position and an extended position.

The cutting head may comprise a drive mechanism for moving the blade from the retracted position towards the extended position, in which position the blade may sever the belt. The drive mechanism may be coupled to the blade such that the blade is actively driven to move in both directions between the retracted position and the extended position. The bi-directional drive may thus provide an active driving force not only to cut the belt, but also to return the blade to the retracted position. If the blade tends to get stuck, the driving force may be increased as required until the blade moves back into the retracted position.

In one embodiment, the drive mechanism comprises a connecting element, and the blade comprises a correspondingly shaped connecting element, wherein the connecting elements form a positive connection with each other when engaged. The drive mechanism may comprise a drive spindle, wherein the connecting element of the drive mechanism is formed on an end portion of the drive spindle.

In an embodiment, the drive spindle may engage a thread formed in the cutting head. The spindle may be bi-directionally moveable relative to the thread. The drive spindle may comprise a second end portion opposite of the first end portion, and the second end portion may comprise a torque input geometry.

In some embodiments, the torque input geometry may be formed as a polygonal recess or polygonal projection. The recess or projection may be formed to accept correspondingly shaped male or female tools for applying torque, in particular in both rotational directions.

In another embodiment, the torque input geometry may be formed as a male or female Torx profile or Torx plus profile.

In an embodiment, the blade may comprise a front side and an opposite back side, and the cutting device may comprise a first stationary edge located adjacent the front side of the blade. Additionally, the cutting device may comprise a second stationary edge located adjacent the back side of the blade. The stationary edges may provide an abutment for the belt.

The cutting device may comprise a cutting base, the cutting head being mounted to the cutting base. The cutting base may comprise a slit which is dimensioned to allow the cutting blade to pass through when moving between the retracted position and the extended position. The first and second stationary edges may be opposite longitudinal edges of the slit.

The cutting head may be pivotably mounted to the cutting base, and may further be pivotably moveable between an open position and a closed position.

In another embodiment, the cutting device may comprise a locking unit for securing the cutting head to the cutting base when pivoted into the closed position.

The locking unit may comprise a locking pin mounted to the cutting base. The cutting head may comprise a recess that is dimensioned to accept the locking pin when in the closed position.

In various embodiments, the cutting device may comprise a handle.

The handle portion may be mounted to the cutting base. The handle may comprise an elongate portion extending away from the cutting base.

The blade may comprise at least one cutting edge. The cutting edge may be oriented non-perpendicularly to the direction of movement of the cutting blade between the retracted position and the extended position.

The blade may comprise a first blade section and a second blade section. The first and second blade sections may be angled opposite to one another. The cutting blade may comprise a first lateral side and a second lateral side opposite the first lateral side, and a center portion extending between the first and second lateral sides. The first and second blade sections may project further towards the extended position at the lateral sides than in the center portion such that upon contact between belt and blade, the belt is cut from its periphery towards its center.

BRIEF DESCRIPTION OF THE FIGURES

Hereinafter, a preferred embodiment of the invention is described in greater detail with reference to the accompanying drawings.

DETAILED DESCRIPTION

Figure 1:
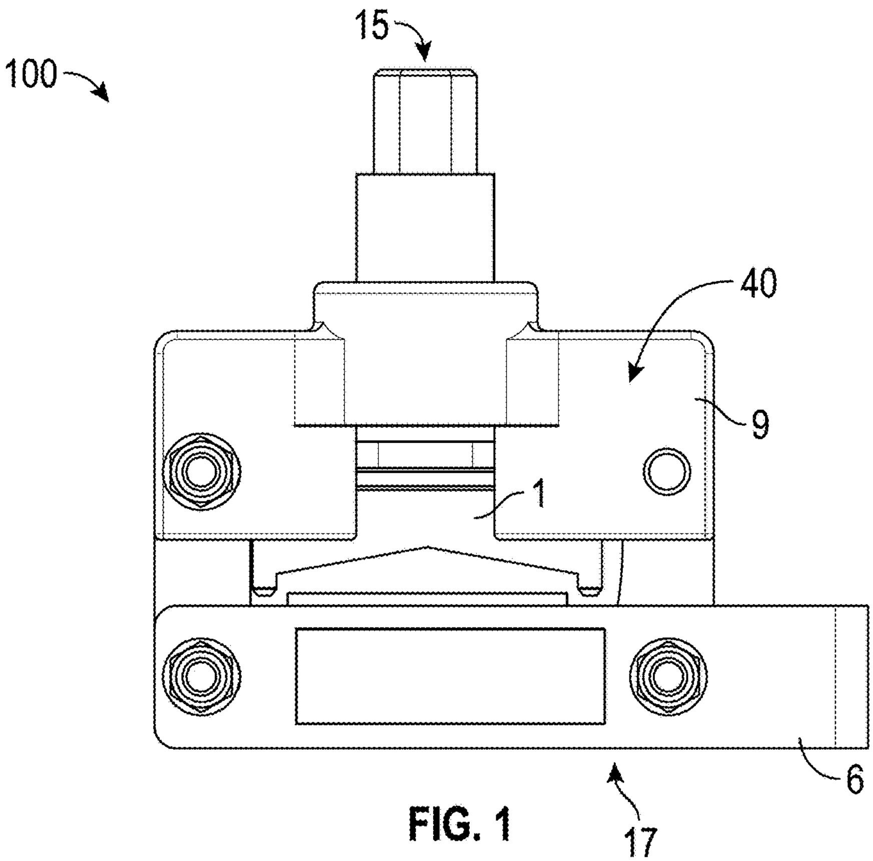
FIGS. 1-3 show different side views of a cutting device according to a preferred embodiment.
Figure 2:
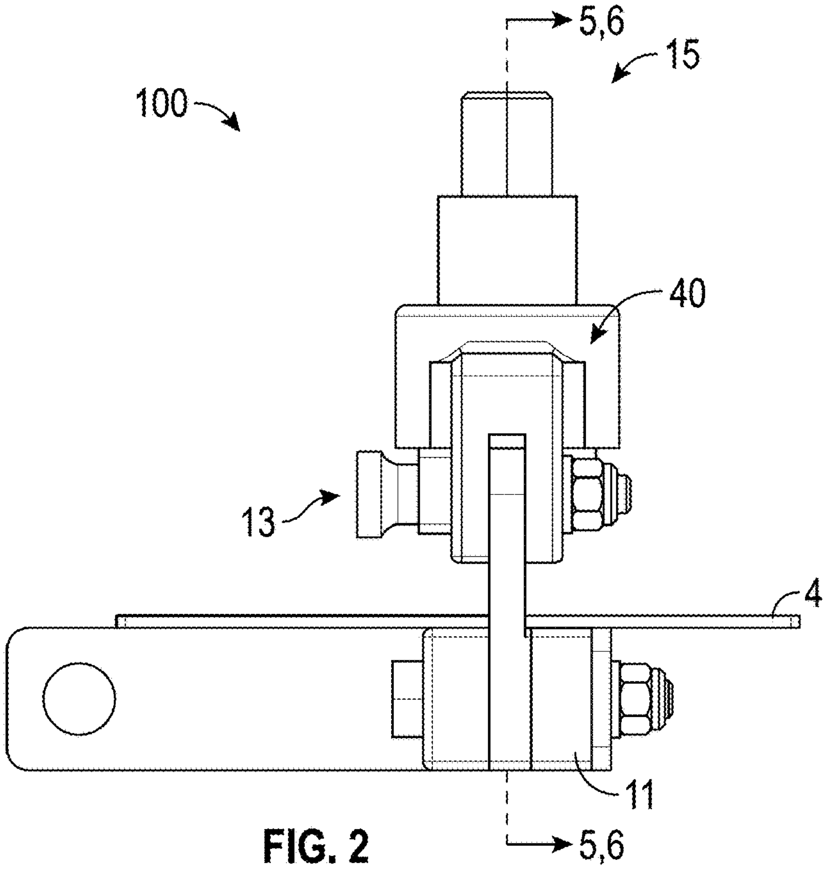
Figure 3:
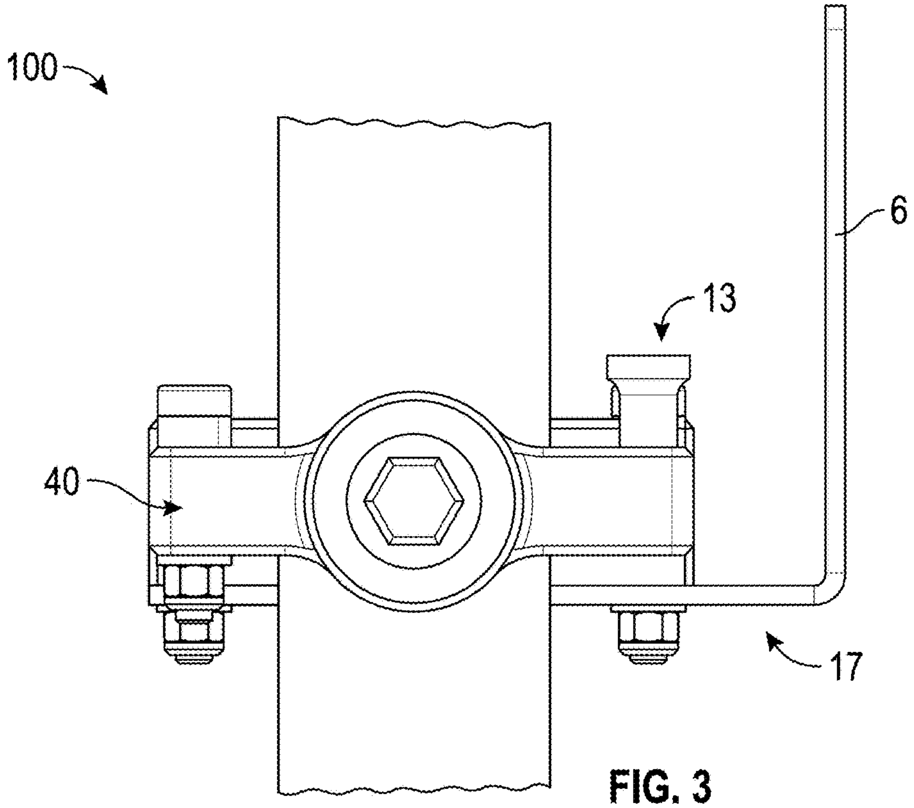
Figure 4:
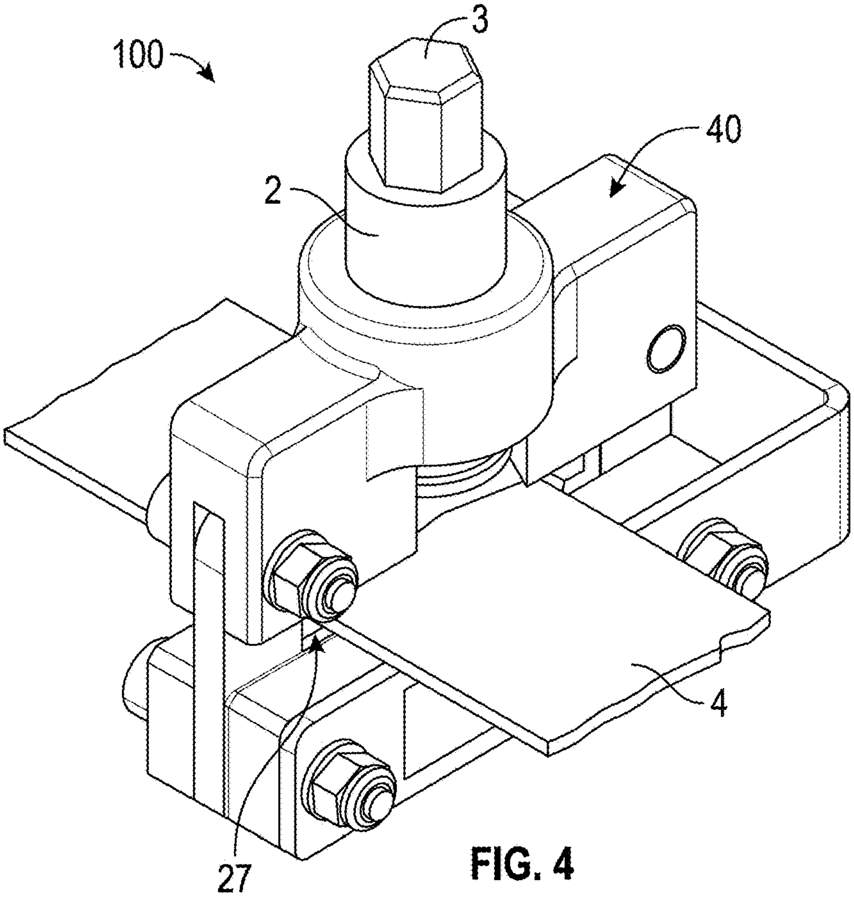
FIG. 4 shows a schematic three-dimensional view on the cutting device of FIGS. 1-3.
Figure 5:
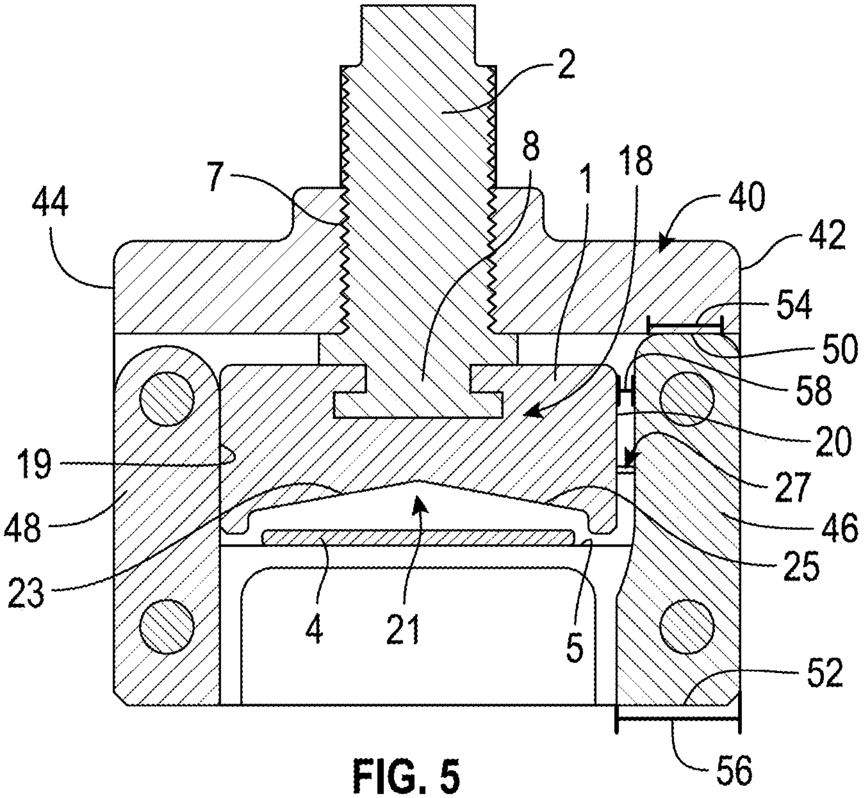
FIG. 5 shows a cross-sectional view along line A-A of FIG. 2 in a first state of movement from the retracted position.
Figure 6:
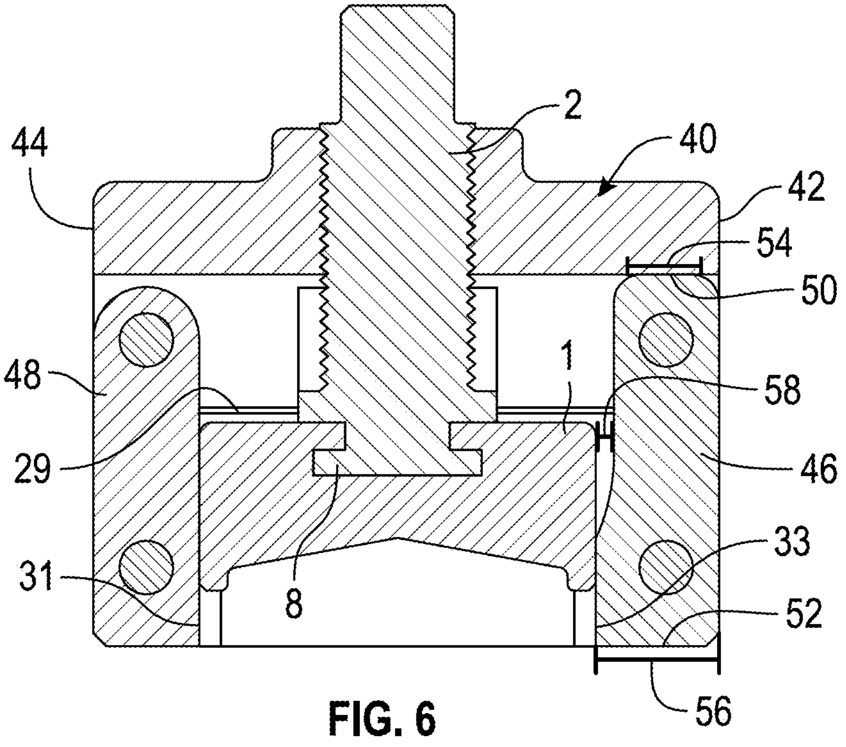
FIG. 6 shows the cross-sectional view of FIG. 5 in a second state of movement towards the extended position.

The cutting device 100 shown in FIGS. 1-4 comprises a cutting base 11 and a cutting head 9 pivotably mounted to the cutting base 11. The cutting head 9 includes a cutting head body 40 extending between a first end 42 and a second end 44. The cutting base 11 includes a first wall 46 and a second wall 48. As shown in FIGS. 5 and 6, the first wall 46 extends between a first end 50 and a second end 52. The first end 50 defines a first width 54 and the second end 52 defines a second width 56. As shown in FIGS. 1, 5, and 6, a gap 58 is defined between the first wall 46 and the blade 1. FIG. 1 illustrates a frontal view of the cutting head 9, which comprises a blade 1 coupled to a drive mechanism 15. The drive mechanism controls the position of the blade 1 such that the blade 1 can move between an extended position and a retracted position. FIGS. 2 and 3 are side and top views of the cutting device 100 illustrating that the cutting head 9 can be locked into the cutting base 11 (e.g. the retracted or closed position) by a locking device 13. In one embodiment, the locking device 13 is comprised of a locking pin on the cutting base 11, which engages with a recess on the cutting head 9 to secure the cutting base 11 to the cutting head 9.

The cutting device 100 is portable and comprises a handle 17, as seen in FIGS. 1 and 3. The handle 17 may be mounted to the cutting base 11 and further comprises an elongate portion 6 which can either be held manually or by a chuck or comparable device.

The drive mechanism 15 of FIGS. 1 and 2 comprises a drive spindle 2 which is bidirectionally movable and engages along a correspondingly formed thread 7 in the cutting head 9. By rotating the drive spindle 2 in a first direction, e.g. clockwise, the drive spindle 2 moves the blade 1 downwards, from the retracted position towards the extended position, during which the blade 1 cuts a belt 4 positioned on the cutting base 11. Rotating the drive spindle 2 in the opposite direction, e.g. counter-clockwise, moves the blade 1 away from the extended position back into the retracted position. In other words, the drive spindle is configured to actively drive the cutting blade both in a cutting direction and in a release direction.

In order to accomplish the movement of extending and retracting the blade 1, the drive spindle 2 comprises a torque input geometry 3 on one end portion. The torque input geometry 3 may be a polygonal recess or polygonal projection configured to accept torque from a correspondingly shaped tool so that the drive spindle 2 rotates and drives the blade 1 bi-directionally, as described above. As seen in FIG. 3, an ideal embodiment of the torque input geometry 3 is a hexagonal projection that is adapted for being engaged by a manual wrench, or even more preferably, a motorized wrench, such as an impact wrench. In another preferred embodiment, the input geometry may be configured as a male or female Torx® or Torx Plus® profile.

The connecting element 8 is also positioned along the formed thread 7 in the cutting head, so that as the drive spindle moves between the two positions, the formed thread 7 provides further guidance of the drive spindle 2.

In order to provide a reliable support for the cutting blade 1, the drive spindle 2 further comprises a connecting element 8 positioned opposite of the torque input geometry 3. FIG. 5 shows that the drive spindle's connecting element 8 engages a correspondingly formed connecting element 18 on the blade 1 to form a positive connection.

The blade 1 is adapted to cut a through a belt 4, (e.g. a wire-reinforced flat belt) positioned on the cutting base 11 when the cutting head moves from its retracted position into its extended position FIGS. 5 and 6 illustrate the blade geometry having a first and second lateral side 19, 20 and a center portion 21 in between the first and second lateral sides 19, 20. The blade 1 extends further towards the extended position in the vicinity of the lateral sides 19, 20 than in the center portion 21. The blade 1 has at least one cutting edge 25 that is oriented non-perpendicularly to the direction of the blade's movement between the retracted and extended positions. In an embodiment, the blade further comprises a first and a second blade section 23, 25, the blade sections being angled oppositely with respect to one another and being oriented non-perpendicularly to the direction of movement of the blade.

The cutting base 11 comprises a slit 27 in the plane shown in FIGS. 5 and 6. The slit is delimited by two longitudinal edges 29 which act as stationary edges against the blade 1 and two lateral sides 31, 33 which are opposite one another and which allow the blade 1 to pass through and also act as guiding means for the blade 1 when moving into the extended position shown. The stationary edges also provide an abutment for the belt 4 as it is positioned on the cutting base 11. As the blade 1 moves from its retracted position to the extended position, the blade 1 contacts and cuts the belt 4 from the belt's periphery to its center.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, or component is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The invention claimed is:

1. A portable belt cutting device, comprising:

a cutting head;

a cutting blade configured to cut a belt, the cutting blade including an integrally-formed blade connecting element with the cutting blade configured to be moveably arranged on the cutting head and supported by the cutting head such that the cutting blade is moveable between a retracted position and an extended position;

a cutting base, the cutting head coupled to the cutting base, the cutting base including two walls and a bottom portion defining an aperture to receive the belt; and a locking unit for securing the cutting head to the cutting base;

wherein the cutting head comprises a drive spindle for moving the cutting blade from the retracted position to the extended position toward and in contact with the bottom portion, the drive spindle comprises a drive spindle connecting element integrally formed at an end portion of the drive spindle, and the drive spindle connecting element is rotatable with, and directly coupled to, the cutting blade connecting element;

wherein after removal of the cutting base, the cutting blade is removable from the drive spindle without the aid of additional parts;

wherein in the retracted position a gap is defined between at least one of the two walls and the cutting blade, and in the extended position the cutting blade is configured to interface with the two walls; and wherein removing the locking unit enables the cutting head to pivot with respect to the cutting base.

2. The cutting device of claim 1, wherein:

the drive spindle engages a thread formed in the cutting head, the drive spindle being bi-directionally moveable relative to said thread, the end portion of the drive spindle is a first end portion, and the drive spindle comprises a second end portion opposite of the first end portion, the second end portion comprising a torque input geometry.

3. The cutting device of claim 2, wherein the torque input geometry is formed as a polygonal recess or a polygonal projection, said recess or said projection configured to accept correspondingly shaped male or female tools for applying torque, in both rotational directions.

4. The cutting device of claim 2, wherein the torque input geometry is formed as a male or a female hexalobular pattern.

5. The cutting device of claim 1, wherein the locking unit comprises a locking pin mounted to the cutting base, and the cutting head comprises a recess, said recess being dimensioned to except the locking pin when in the closed position.

6. The cutting device of claim 1, further comprising a handle portion mounted to the cutting base.

7. The cutting device of claim 1, wherein the cutting blade comprises at least one cutting edge, said cutting edge being oriented non perpendicularly to the direction of movement of the cutting blade between the retracted position and the extended position.

8. The cutting device of claim 7, wherein the cutting blade comprises a first blade section and a second blade section, the first and second blade sections being angled oppositely to one another;

wherein the cutting blade comprises a first lateral side and a second lateral side opposite the first lateral side, and a center portion extending between the first and second lateral sides, and wherein the first and second blade sections project further towards the extended position at the lateral sides than in the center portion such that upon contact between belt and blade, the belt is cut from its periphery towards its center.

9. The cutting device of claim 1, wherein the cutting head comprises a cutting head body extending between a first end and a second end, the first end of the cutting head body coupled to one of the walls, the second end of the cutting head body offset from the two walls.

10. The cutting device of claim 1, wherein one of the walls includes a first end defining a first width and a second end defining a second width, the second width greater than the first width, the second end configured to interface with the cutting blade in the extended position, the gap defined between the first end and the cutting blade in the retracted position.

11. A portable belt cutting device, comprising:

a cutting head;

a cutting blade configured to cut a belt, the cutting blade including an integrally-formed blade connecting element with the cutting blade configured to be moveably arranged on the cutting head and supported by the cutting head such that the cutting blade is moveable between a retracted position and an extended position;

a cutting base, the cutting head coupled to the cutting base, the cutting base including a first wall, a second wall, and a bottom portion defining an aperture to receive the belt; and a locking unit for securing the cutting head to the cutting base, the first wall located closer to the locking unit than the second wall;

wherein the cutting head comprises a drive spindle for moving the cutting blade from the retracted position to the extended position toward and in contact with the bottom portion, wherein the coupling between the cutting blade and the drive spindle is only two parts, wherein in the retracted position a gap is defined between at least one of the two walls and the cutting blade and the cutting blade is enabled to move with respect to the two walls, and in the extended position the cutting blade is configured to interface with the two walls, and wherein the cutting head is pivotably mounted to the cutting base, and the gap enables the cutting head to pivot when the locking unit is removed.

* * * * *